United States Patent
Muller et al.

(10) Patent No.: US 8,365,063 B2
(45) Date of Patent: Jan. 29, 2013

(54) ACCESSIBLE LIST NAVIGATION

(75) Inventors: Michael Muller, Medford, MA (US); Corinne M. Ryan, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 2271 days.

(21) Appl. No.: 11/168,601

(22) Filed: Jun. 28, 2005

(65) Prior Publication Data
US 2006/0294466 A1 Dec. 28, 2006

(51) Int. Cl.
*G06F 17/00* (2006.01)
(52) U.S. Cl. ......... 715/208; 715/729; 715/760; 715/817
(58) Field of Classification Search .............. 715/202, 715/208, 233, 727, 729, 760, 811–813, 817, 715/824, 828
See application file for complete search history.

(56) References Cited

U.S. PATENT DOCUMENTS

| | | | | |
|---|---|---|---|---|
| 6,507,352 | B1 * | 1/2003 | Cohen et al. | 715/817 |
| 6,948,135 | B1 * | 9/2005 | Ruthfield et al. | 715/854 |
| 6,993,707 | B2 * | 1/2006 | Baker et al. | 715/241 |
| 7,130,851 | B1 * | 10/2006 | Brown et al. | 707/7 |
| 7,216,351 | B1 * | 5/2007 | Maes | 719/328 |
| 2002/0178007 | A1 | 11/2002 | Stotznick et al. | |
| 2004/0186713 | A1 | 9/2004 | Gomas et al. | |
| 2004/0205579 | A1 * | 10/2004 | Brassell et al. | 715/513 |
| 2004/0221242 | A1 * | 11/2004 | Chen et al. | 715/810 |
| 2005/0262021 | A1 * | 11/2005 | Wood et al. | 705/44 |

OTHER PUBLICATIONS

"JAWS for Windows 5.0," "JAWS for Windows 5.0 Features and Enhancements," Jun. 11, 2004, published by www.freedomscientific.com.*

* cited by examiner

*Primary Examiner* — Adam M Queler
(74) *Attorney, Agent, or Firm* — Steven M. Greenberg, Esq.; Carey, Rodriguez, Greenberg & O'Keefe

(57) ABSTRACT

Embodiments of the present invention provide a method, apparatus and computer program product for accessible list navigation. In one embodiment of the invention, a user interface article of manufacture configured for accessible list navigation can include markup defining a list including multiple list item, an obscured marker associated with at least one of the list items, and jump logic disposed in the obscured marker. Specifically, the jump logic can be programmed to navigate to a specified different one of the list items responsive to an activation of the obscured marker. Finally, alternate text can be disposed in the obscured marker which identifies the different one of the list items. As such, assistive technology can be programmed to read back the alternate text responsive to an activation of the obscured marker.

2 Claims, 3 Drawing Sheets

ACCESSIBLE LIST NAVIGATION

BACKGROUND OF THE INVENTION

1. Field of the Invention

The present invention relates to accessible user interface elements in a computer program and more particularly to accessible forms of list navigation in a user interface.

2. Description of the Related Art

Prior to the popularization of the Internet and the subsequent implementation of the World Wide Web ("the Web"), software publishers typically distributed computer applications via storage media such as a computer diskette or compact disc. Initially, such stand-alone computer applications included underlying program logic, data storage and, optionally, a user interface. Recently, given the popularization of the Internet and the Web, it is no longer reasonable to presume that computer applications are distributed exclusively via disk medium. Rather, in many cases, conventional computer programs are distributed electronically via the Internet. More importantly, however, in many cases computer applications are no longer distributed as stand-alone executable programs. Rather, many computer applications are distributed as markup language specified, browser based applications which can include a collection of hypermedia documents such as Web pages which can be viewed in hypermedia content browsers such as Web browsers.

In the case of a markup language specified computer program, users can interact with the underlying program logic not through a traditional GUI, but through a GUI provided by GUI elements embedded in a hypermedia document displayed in a content browser. Conventional markup can specify a user interface and corresponding logic which can be processed and rendered through use of a content browser. Content browsers process display attributes embedded in markup to properly format content also contained within the markup. Notable variants of the content browser include the venerable Web browser, as well as the more recent extensible markup language (XML) browser. Regardless of the type of browser, all conventional markup processors are preconfigured to parse and interpret attribute tags embedded in markup.

For more than ten years, computer scientists and engineers have addressed the accessibility of the computer program user interface—particularly for the benefit of those end users whose working conditions or disability status [SMG1] make them unable to interact with a computer program utilizing conventional means such as a mouse or keyboard. Presently, several assistive technologies have been widely distributed, usually in concert with the distribution of an operating system, to provide one or more alternative user interface mechanisms for the purpose of enhanced accessibility. Examples of assistive technologies include an audio user interface such as a screen reader.

Assistive technologies have proven to be highly successful among visually challenged computing end users. Still, assistive technologies have not yet adapted to the underlying changes in respect to the modern form of the computer program. Specifically, whereas in a conventionally distributed computer program, assistive technologies like the screen reader can be easily enabled, markup language specified computer programs have not yet enjoyed the comprehensive integration of assistive technologies, especially concerning the functional (in-use) accessibility of complex displays or user interface structural elements.

Often, within a user interface, it is necessary to present a long list to a user such that the user can inspect or select one or more items from a list. Examples include buddy lists, e-mail contact lists, font lists, parts lists, book lists and executable items on a pull-down menu. Clearly, a longer list containing a multiplicity of items can be difficult for even an able-bodied user to navigate. For the disabled, the problem is much worse. To address the problem of accessibility of a list in a user interface, many technologies have been proposed, including twisties for sublists and the bolding or highlighting of landmark entries in a list such as the first entry in the list which begins with a new letter as follows: *apples*, apricots, artichokes, *bananas*, beets, *carrots*, cucumbers, . . . , *tomatoes*.

As an alternative to modifying the appearance of individual items in a list, it has been proposed to truncate lists to include only the most frequently selected items. By presenting a truncated form of the list, sighted users can more readily review the items in a list. Of course, for a sight impaired individual, the truncation actually exacerbates the problem. Specifically, sight impaired users often memorize keystroke counts to select an item in a list. A typical memorized selection sequence can include, "Strike the Down Arrow key four times and the Enter key once" (whereas a user with unimpaired vision would use visual cues to navigate the list). To change the sequence or order of items in a list, then, can disorient a sight impaired user.

Regardless of the deficiencies of current dynamic solutions to the list navigation problem, dynamic implementations of markup languages and scripting aspects of markup languages, such as the popular dynamic hypertext markup language (DHTML) cannot always support important aspects of assistive technologies such as precise user interface element focus establishment. Consequently, even the most clever of assistive methodologies for navigating lists cannot be readily translated to the markup language defined user interface domain.

BRIEF SUMMARY OF THE INVENTION

Embodiments of the present invention address deficiencies of the art in respect to assistive navigation of a list, and provide a novel and non-obvious method, article of manufacture and computer program product for accessible list navigation. One embodiment of the invention can include a user interface article of manufacture configured for accessible list navigation. In this embodiment, the user interface article of manufacture can include markup defining a list including multiple list item, an obscured marker associated with at least one of the list items, and jump logic disposed in the obscured marker. Specifically, the jump logic can be programmed to navigate to a specified different one of the list items responsive to an activation of the obscured marker.

The obscured marker can remain obscured from view of a sighted end user, but can be utilized programmatically to call attention to associated list items for a sight impaired user. Thus, in an optional embodiment of the invention, the obscured marker can be a miniscule image. Alternatively, the obscured marker can be limited text such as a character or set of characters or other textual indicia. The jump logic also can be a named anchor specifying the different one of the list items. Also, the jump logic can be script logic programmed to jump to the different one of the list items associated with a provided identifier. Finally, alternate text can be disposed in the obscured marker which identifies the different one of the list items. As such, assistive technology can be programmed to read back the alternate text responsive to an activation of the obscured marker.

A method for accessible list navigation can include navigating from a list item in a list to a corresponding obscured marker in the list, and, responsive to an activation of the obscured marker, jumping to another list item in the list specified by jump logic disposed within the obscured marker. The method further can include, responsive to the navigating from the list item in the list to the corresponding obscured marker, extracting alternate text from the obscured marker which identifies the another list item in the list and reading back the extracted alternate text.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, article of manufacture and computer program product for accessible list navigation. In accordance with an embodiment of the present invention, a list can be composed to include jump logic for at least one list item in the list. The jump logic, which as an example can include script logic or a named anchor, can refer to a jump item in the list. In the case of the named anchor, the named anchor can be associated with an obscured indicia. In either case, alternate text can be provided for the jump logic which can indicate the jump item in the list. In this way, when selected, the jump logic can be processed by assistive technology to indicate the jump item. Moreover, the activation of the jump logic can cause the selection of the jump item so as to provide accessible list navigation.

Figure 1:
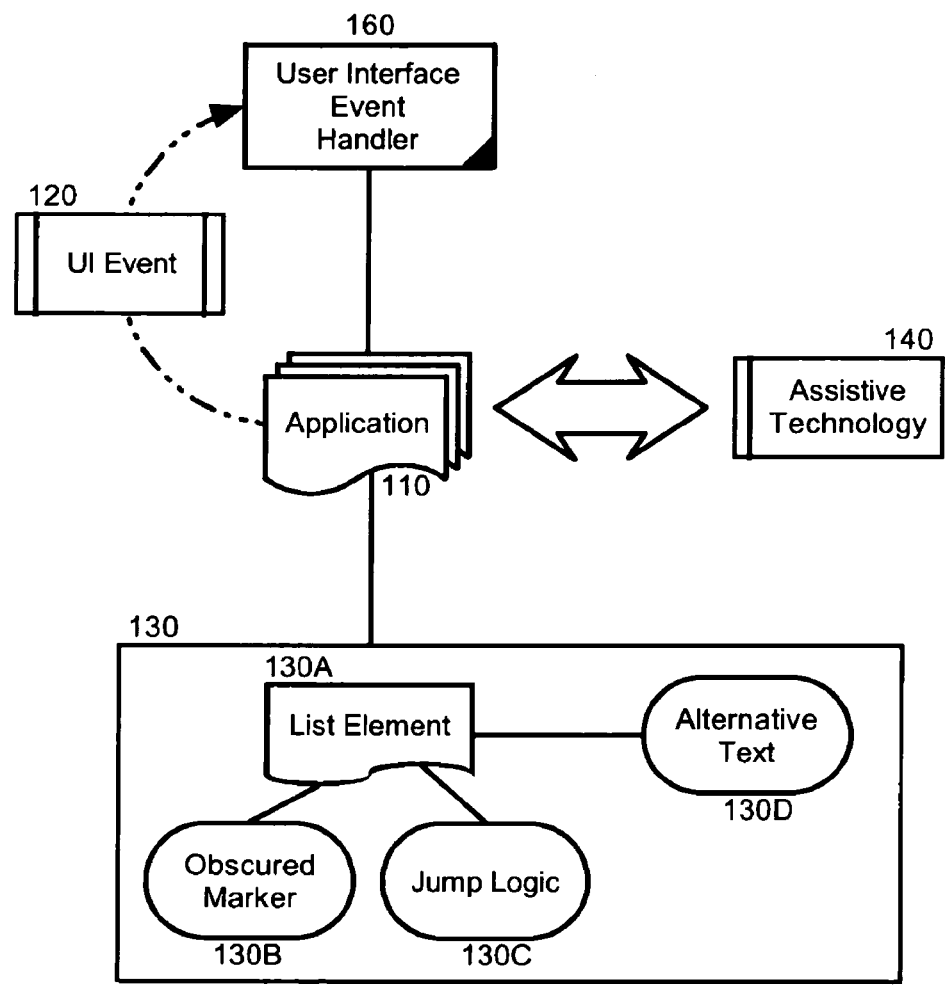
FIG. 1 is a schematic illustration of a data processing system configured for accessible list navigation.

In further illustration, FIG. 1 is a schematic illustration of a data processing system configured for accessible list navigation. The system can include an application 110 configured with an accessible list 130 in a corresponding user interface (not shown). The accessible list 130 can include one or more list items 130A. At least one of the list items 130A can include an obscured marker 130B, such as a small graphical image (preferably a one pixel by one pixel image), or brief textual indicia.

The obscured marker 130B can include jump logic 130C associated with a different one of the list items 130A in the list 130. In this regard, when activated, the jump logic 130C can cause focus in the list to navigate to the associated different one of the list items 130A in the list 130. Optionally, the obscured marker 130B can include alternate text 130D specifying the different one of the list items 130A. It will be recognized by the skilled artisan that the obscured marker 130B can permit the inclusion of the jump logic 130C and alternate text 130D in the list 130 without distracting an interacting end user.

Interactions with the list 130 can be passed to a user interface event handler 160 as a user interface event 120. The user interface event handler 160 can detect selection, activation, key down, mouse down, and navigation events, to name a few, and can process each accordingly. For instance, within the list 130, a navigation event can cause the selection of a different selectable widget in the list 130 such as another of the list items 130A or the obscured marker 130B containing jump logic 130C and alternate text 130D. An activation event, in turn, can cause the user interface event handler 160 to execute a link associated with a selected widget. Finally, a selection event can result in the user interface event handler 160 selecting the associated widget.

When a list item 130A in the list has been selected, descriptive text associated with the selected list item 130A can be passed to assistive technology 140. The assistive technology 140, for example a screen reader, can audibly play back the descriptive text so that the descriptive text can indicate the identity of the selected list item 130A. By comparison, when the obscured marker 130B has been selected, the alternate text 130D can be passed to the assistive technology 140 so that the audible playback of the alternate text 130D can indicate the identity jump logic 130C if the obscured marker 130B is activated.

Figure 2:
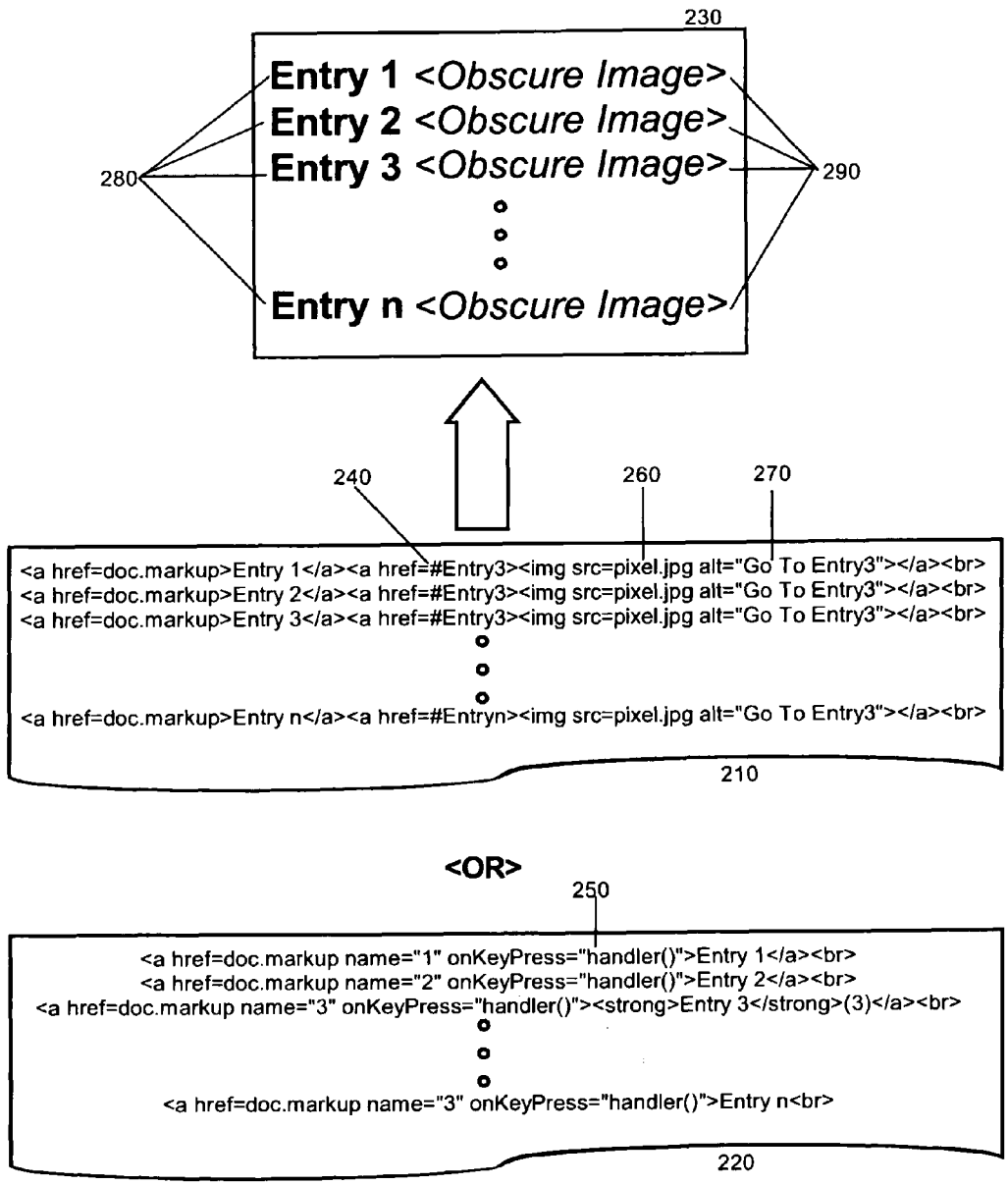
FIG. 2 is a pictorial illustration of a markup defined list and underlying markup configured for accessible list navigation; and, FIG. 3 is a flow chart illustrating a process for providing accessible list navigation in a user interface.

In more particular illustration, FIG. 2 is a pictorial illustration of exemplary markup 210, 220 defining a list 230 and included jump logic 240, 250. As shown in FIG. 2, a list 230 having one or more list items 280 can be defined by markup 210, 220 including a set of markup language tags and attribute strings shown in the markup 210 as <a href=doc.markup>Entry X</a> where Entry X is the textual content of the list item. An obscured marker 290 can be associated with each list item 280 as denoted by the tag and attribute string <a href=#Entry3><img src=pixel.jpg alt="Go to Entry3"></a> in markup 210. The obscured marker 290 can include jump logic in the form of a named anchor 240 "href=#Entry3". Optionally, the obscured marker 290 further can include alternate text 270 "Go to Entry3".

In this way, the selection of the obscured marker 290 can cause the assistive technology to read back the text 270 "Go to Entry3" while the activation of the obscured marker 290 can cause the navigation from the selected obscured marker 290 to the list item 280 named Entry3. The obscured marker 290, itself, can be a miniscule graphic image or limited text unlikely to draw notice by interacting end users so as to maintain the appearance that the list 230 includes nothing but list items 280. Even still, the obscured marker 290 can be selected so as to trigger the audible read back of the alternate text 270.

Optionally, instead of a named anchor 240 as shown in the first markup 210, the jump logic can include script logic 250 referenced in the second markup 220. As shown in the second markup 240, the obscured marker 290 can include jump logic which can reference script logic 250 "handler( )" when the event "onKeyPress" is detected. The script logic 250 can include code for decoding a keystroke, reading back the keystroke and performing a jump to the specified list item associated with the keystroke. As an example, the code can include:

```
<form>
<script language="JavaScript"><!--
    function handler(e) {if (document.all) {e = window.event;}
        var key;
        if (document.layers) key = e.which;
        if (document.all) key = e.keyCode
        var chr = String.fromCharCode(key);
        document.getElementById(chr).focus( )
}//--></script>
```

Figure 3:
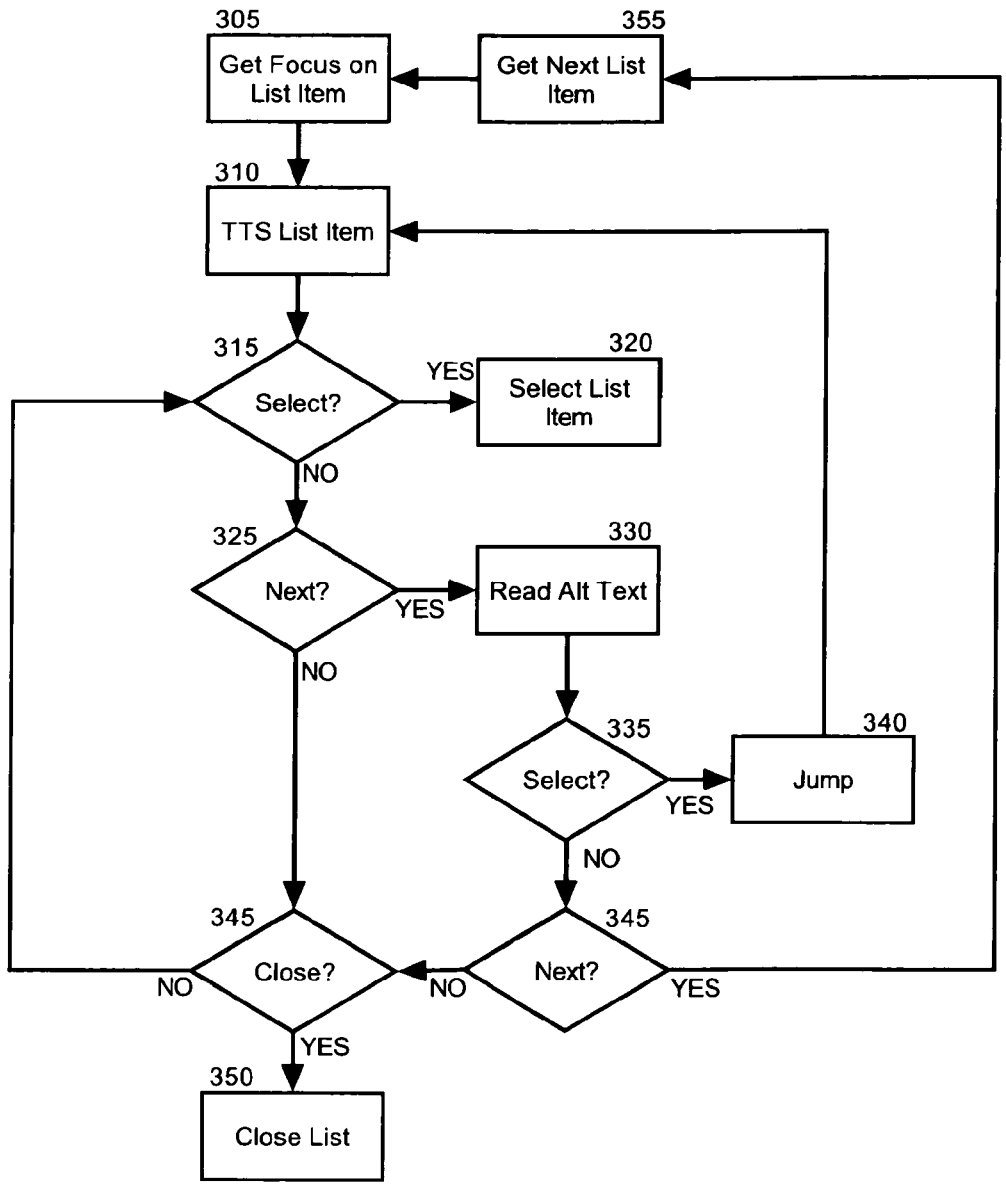

FIG. 3 is a flow chart illustrating a process for providing accessible list navigation in a user interface. Beginning in block 305, focus can be received in a list item in a list. In block 310, text associated with the list item which identifies the list item can be read back to an interacting user. In decision block 315, it can be determined whether the list item has been selected. If so, in block 320, the list item can be selected and the list can be closed. Otherwise, in decision block 325, it can be determined whether the interacting user has chosen to navigate to the next widget in the list. If so, focus can pass to an obscured marker for the list item.

Specifically, in block 330, the alternate text for the obscured marker can be read back to the interacting user. In decision block 335, it can be determined whether the obscured marker has been selected. If so, in block 340 focus can jump to the list item specified by jump logic in the obscured marker. Otherwise, in decision block 345 it can be determined whether the interacting user has chosen to navigate to the next widget in the list. If so, in block 355 the next list item in the list can be retrieved and the process can begin anew in block 305. Otherwise, in decision block 345 it can be determined whether or not to close the list. If so, in block 350 the list can be closed and the process can end.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for accessible list navigation, the method comprising the steps of:

navigating from a list item in a list to a corresponding obscured marker in said list; and, responsive to an activation of said obscured marker, jumping to another list item in said list specified by jump logic disposed within said obscured marker.

2. The method of claim 1, further comprising the step of, responsive to said navigating from said list item in said list to said corresponding obscured marker, extracting alternate text from said obscured marker which identifies said another list item in said list and reading back said extracted alternate text.

\* \* \* \* \*